United States Patent [19]

Pensack

[11] 3,923,983

[45] *Dec. 2, 1975

[54] MEDICATED POULTRY COMPOSITION AND METHOD EMPLOYING CERTAIN SULFATE COMPOUNDS

[75] Inventor: Joseph Michael Pensack, Trenton, N.J.

[73] Assignee: American Cyanamid Company, Stamford, Conn.

[ * ] Notice: The portion of the term of this patent subsequent to Sept. 29, 1987, has been disclaimed.

[22] Filed: Aug. 3, 1970

[21] Appl. No.: 60,627

Related U.S. Application Data

[60] Division of Ser. No. 561,053, June 28, 1966, Pat. No. 3,531,568, which is a continuation-in-part of Ser. No. 313,171, Oct. 2, 1963, abandoned.

[52] U.S. Cl. .................. 424/164; 424/120; 424/270
[51] Int. Cl.² .......................................... A61K 33/04
[58] Field of Search ........... 424/116, 120, 164, 270; 99/2, 4

[56] References Cited
UNITED STATES PATENTS

| | | | |
|---|---|---|---|
| 3,121,634 | 2/1964 | Kichline | 99/4 |
| 3,157,512 | 11/1964 | Muller | 99/2 |
| 3,178,341 | 4/1965 | Hamill et al. | 424/121 |

*Primary Examiner*—V. D. Turner
*Attorney, Agent, or Firm*—Jack W. Richards

[57] ABSTRACT

This invention involves means for controlling infectious diseases in poultry by feeding poultry a medicated drinking water composition containing a medicament such as tylosin and sodium sulfate, for example, which has the effect of causing the poultry to ingest larger quantities of the medicated water and thus combat infectious diseases.

2 Claims, No Drawings

MEDICATED POULTRY COMPOSITION AND METHOD EMPLOYING CERTAIN SULFATE COMPOUNDS

This application is a division of my copending application Ser. No. 561,053, now U.S. Pat. No. 3,531,568, filed June 28, 1966, which application, in turn, is a continuation-in-part of my application Ser. No. 313,171, filed Oct. 2, 1963, now abandoned.

This invention relates to a medicated poultry composition and more particularly is concerned with a novel medicated poultry drinking water composition containing a substance which induces the poultry consuming the same to consume above normal quantities of the medicament contained therein.

It has been standard practice for a number of years in the poultry industry to administer medicaments such as the broad-spectrum antibiotics chlortetracycline, tetracycline, oxytetracycline, demethylchlortetracycline and the like to poultry as part of their diet, and usually in the drinking water, in order to control infectious diseases, particularly those of sub-clinical nature, and for the purpose of stimulating the growth of poultry. The prophylactic and therapeutic use of such antibiotics has met with wide commercial acceptance. However, complete or even substantially complete utilization of the antibiotics has not heretofore been achieved when the antibiotics are orally administered. Apparently, this is due to incomplete absorption of the antibiotic by the poultry which is believed to be due at least in part to the presence of calcium and other metallic cations in the diet which form a complex with the antibiotic and prevents complete absorption thereof. Accordingly, full utilization of such antibiotics has not been achieved and any method which would permit maximum absorption of the antibiotic would be highly desirable.

Chronic respiratory disease is a respiratory infection of chickens and turkeys characterized by respiratory rales, coughing, and nasal discharge. The clinical manifestations are slow to develop and the disease has a long course. Chronic respiratory disease has become an important flock problem in all areas of the United States, and losses from this disease may be very costly to the producer. It is also present in Canada, Australia, Holland, South Africa and Brazil. *Mycoplasma gallisepticum* is the pathogenic avian pleuropneumonia-like organism (PPLO) causing chronic respiratory disease.

Chlortetracycline, among other drugs, has been used to combat this infection. Another drug that has been found to be effective is the antibiotic known as tylosin. This antibiotic is described in British Pat. No. 901,273.

Several methods of administration of these drugs may be used effectively, but the method found most practical for use in the field is administration in the drinking water at recommended levels of about 2 grams per gallon. While such drug levels are generally palatable to poultry and will usually control PPLO in a diseased flock, if the flock should become infected with PPLO and Coliform simultaneously, high levels of medication are required and such medication must be provided in the matter of a few days or it can be expected that from 20 to 30% of the flock will be lost either by death or condemnation at slaughter. It is, therefore, necessary, when disease symptoms are recognized, to assure that high levels of medication are ingested by the entire flock as rapidly as possible. In the past this has been a very real problem, for sick birds lose their appetite for food and drink. Thus at the critical stage, the birds consume less, rather than more, medicament.

Another disease which plagues the poultry industry and which can claim from 50 to 100% of a flock in a matter of several days after infectious symptoms are noted is Blackhead disease, more accurately known as infectious enterohepatitis or histomoniasis. The disease is caused by a microscopic, single-cell, protozoan parasite, *Histomonas meleagrides*. The histomonads multiply rapidly in the cecum and cause severa damage such as enlargement of the cecum, ulceration, hemorrhage and thickening with hardening of the cecal walls. 2-Amino-5-nitrothiazole and 2-acetylamino-5-nitrothiazole have been found to be effective against the disease when used alone or in combination with tetracycline antibiotics. However, as stated above, diseased birds tend to lose their appetite for food and drink at the time when medication is most essential. Therefore, when administering these drugs in the drink and feed, which is the only really practical method of administration for a large flock, it can be seen that the amount of medication ingested by the birds is reduced at the critical stage.

The present invention attempts to overcome these problems by the addition to a medicated drinking water composition of a sulfate of a cation carrying a single positive charge. Preferably, these are selected from the group consisting of the monovalent metallic sulfates, sodium sulfate, sodium bisulfate, potassium sulfate and potassium bisulfate; sulfuric acid; ammonium sulfate, ammonium acid sulfate, and mixtures thereof. The sulfate ion has been found to bring about an increased consumption of water and thus an increased consumption of medicament. Also contemplated by the invention are the organic sulfates such as trimethyl ammonium sulfate, dimethyl ammonium sulfate and the like. Secondarily, when the medicament is a tetracycline antibiotic the use of the described sulfate ion actually promotes increased absorption of the antibiotic and thus acts as a potentiating agent or adjuvant and thereby produces higher blood levels of the antibiotic than are obtainable from the use of the antibiotic alone.

In carrying out the present invention, in its simplest aspect, it is necessary only to add to a medicated poultry drinking water a sufficient quantity of a sulfate of a cation carrying a single positive charge to provide from about 0.1 to about 1.0 percent by weight of sulfate ion in the medicated water. In a more preferred embodiment, however, and to conform to usage in the poultry industry it is preferred to add the described sulfate directly to the powdered medicament which is generally packaged in concentrated form for addition to a given quantity of water to produce the desired concentration of drug. Under such circumstances, it is preferred to add from about 0.5 to about 50 grams of sulfate ion per gram of medicament.

The present invention does not depend on the use of any particular medicament as it has been found that the use of the sulfate of a cation carrying a single positive charge increases the consumption of water independent of the medicament used. Thus, the role of the sulfate is simply to induce the consumption of larger amounts of medicament via the poultry drinking water. Consequently, I may use any of the well known standard drugs normally used for the control of poultry diseases as referred to above. As indicated hereinbefore, however, a further advantage of the present invention is achieved when the tetracycline antibiotics are employed because not only are they effective in controlling these diseases as well as in enhancing the growth of poultry but when used with the addition of the described sulfate increased absorption of the antibiotic is achieved and higher blood levels are obtained more rapidly.

The invention will be described in greater detail in conjunction with the following specific examples.

EXAMPLE 1

In the following tests 24 groups of 5 day-old chicks, 24 groups of 12 day-old chicks and 36 groups of 19 day-old chicks were selected from three flocks. Birds in each particular flock were of substantially the same weight and size and 12 birds were selected at random for each group.

Four combinations of prepared feed and drink were selected for testing in the 5 and 12 day-old chicks and two additional combinations were used in the tests with the 19 day-old chicks. The feed and drink combinations used in these tests were as follows:

Feed and Drink Combinations

|  | Feed | Water |
|---|---|---|
| Diet I | feed + 200 ppm CTC | $H_2O$ |
| Diet II | feed + 200 ppm CTC | $H_2O$ + 0.71% $Na_2SO_4$ |
| Diet III | feed | $H_2O$ + 500 ppm CTC |
| Diet IV | feed | $H_2O$ + 500 ppm CTC + 0.71% $Na_2SO_4$ |
| Diet V | feed + 200 ppm CTC | $H_2O$ + 500 ppm CTC |
| Diet VI | feed + 200 ppm CTC | $H_2O$ + 500 ppm CTC + 0.71% $Na_2SO_4$ |

The diet used in all tests was ground yellow corn containing 1% calcium carbonate and supplemented with chlortetracycline (CTC) as indicated in the feed and drink combination table.

After selection of the chicks for the various groups to be tested, each group was separately caged. All groups were fasted overnight and the following morning all of the various groups were permitted to feed and drink ad libitum the diet selected. Each of the above-noted diets, III through VI, were given to six separate groups of chicks from the 19 day-old flock.

Two hours after feeding was begun 14 groups of chicks, one group from each dietary group in each of the 5, 12 and 19 day-old flocks, were selected. All birds in each group were bled by cardiac puncture and 1½ ml. of blood taken and assayed microbiologically for chlortetracycline blood levels. At 4, 6, 8, 16 and 24 hour periods after feeding was begun, additional groups (one from each dietary group in each of the 5, 12 and 19 day-old flocks) were bled and blood serum levels of CTC ascertained microbiologically. The results obtained appear in the table below.

TABLE I

|  | Age of Chicks in Days | Hours | Blood CTC at | | | | |
|---|---|---|---|---|---|---|---|
|  |  |  | 4 | 6 | 8 | 16 | 24 |
| Diet I | 19 |  | 0.14 | 0.18 | 0.16 | 0.17 | 0.13 |
| Diet II | 19 |  | 0.18 | 0.20 | 0.19 | 0.31 | 0.22 |
| Diet III | 5 |  | 1.53 | 2.25 | 1.78 | 1.98 | 1.03 |
|  | 12 |  | 0.77 | 1.07 | 1.17 | 0.90 | 0.82 |
|  | 19 |  | 0.28 | 0.34 | 0.46 | 0.30 | 0.27 |
| Diet IV | 5 |  | 5.45 | 3.19 | 4.05 | 2.78 | 3.63 |
|  | 12 |  | 1.22 | 1.45 | 1.32 | 1.31 | 0.66 |
|  | 19 |  | 0.33 | 0.55 | 0.99 | 0.68 | 0.39 |
| Diet V | 5 |  | 2.18 | 2.13 | 3.11 | 1.57 | 1.44 |
|  | 19 |  | 0.27 | 0.48 | 0.34 | 0.33 | 0.28 |

TABLE I-continued

|  | Age of Chicks in Days | Hours | Blood CTC at | | | | |
|---|---|---|---|---|---|---|---|
|  |  |  | 4 | 6 | 8 | 16 | 24 |
|  | 12 |  | 1.19 | 1.79 | 1.14 | 0.89 | 0.80 |
| Diet VI | 5 |  | 4.38 | 5.15 | 3.43 | 3.61 | 3.13 |
|  | 19 |  | 0.35 | 0.33 | 0.50 | 0.69 | 0.55 |
|  | 12 |  | 1.68 | 1.91 | 1.91 | 1.42 | 1.30 |

From these data it can be seen that (1) the CTC blood levels, from a given amount of CTC orally administered, are significantly increased in poultry of all ages when sodium sulfate is added to the poultry drinking water; (2) the blood levels obtainable from a given amount of CTC potentiated with a given amount of sodium sulfate are significantly higher in young chicks than in older birds. It is an advantage that CTC blood levels in young chicks are very high for while young chicks are susceptible to disease infection, rapid and effective treatment against disease is possible. High CTC blood levels in young chicks is also advantageous since rapid growth rate and control of diseases reduces the cost of raising poultry.

3. These data demonstrate the potentiating effect of sodium sulfate on CTC blood levels when CTC is administered to poultry in the drinking water along with the sodium sulfate.

4. These data also show the potentiating effect on CTC blood levels when sodium sulfate is administered in the drinking water and CTC is provided in both the drinking water and feed.

5. Finally, the data show that addition of sodium sulfate to drinking water of poultry consuming a feed supplemented with CTC will produce an increase in CTC blood levels in the poultry.

EXAMPLE 2

Twenty-six day-old chicks of substantially similar size and weight were randomly divided into 36 groups of 12 chicks each. The groups were separately caged and starved overnight. The following morning the tests were begun with all groups being permitted to eat and drink ad libitum the prepared diets and drink provided. The basal ration used for all groups comprised a ground yellow corn containing 1% calcium carbonate and specified quantities of chlortetracycline (CTC). Water to which specified amounts of sodium sulfate and chlortetracycline has been added was supplied to the chicks for drinking purposes.

Six combinations of prepared feed and drink were selected for the tests and the combinations used were as follows:

Feed and Drink Combinations

|  | Feed | Water |
|---|---|---|
| Diet I | feed + 200 ppm CTC | $H_2O$ |
| Diet II | feed + 200 ppm CTC | $H_2O$ + 0.71% $Na_2SO_4$ |
| Diet III | feed | $H_2O$ + 500 ppm CTC |
| Diet IV | feed | $H_2O$ + 500 ppm CTC + 0.71% $Na_2SO_4$ |
| Diet V | feed + 200 ppm CTC | $H_2O$ + 500 ppm CTC |
| Diet VI | feed + 200 ppm CTC | $H_2O$ + 500 ppm CTC + 0.71% $Na_2SO_4$ |

Each of the above-noted diets was given to six randomly selected groups of chicks. Two hours after feeding had begun one group of chicks from each dietary group was selected. All birds in each group were bled by cardiac puncture and 1½ ml. of blood taken and assayed microbiologically for CTC blood levels. At 4, 6, 8, 16 and 24 hour periods after feed was begun, additional groups (one from each dietary group) were bled and blood serum levels of CTC ascertained microbiologically. Results of these tests are provided below.

TABLE II

26-Day-old Chicks
Blood CTC at

| | Hours 4 | 6 | 8 | 16 | 24 |
|---|---|---|---|---|---|
| Diet I | .12 | .13 | .10 | .11 | .07 |
| Diet II | .09 | .14 | .17 | .18 | 1.6 |
| Diet III | .28 | .17 | .15 | .40 | .18 |
| Diet IV | .28 | .19 | .30 | .17 | .29 |
| Diet V | .15 | .30 | .23 | .32 | .28 |
| Diet VI | .31 | .34 | .42 | .38 | .27 |

From this data it can be seen that substantially higher CTC blood levels can be obtained from a diet containing a given amount of CTC when sodium sulfate is added to the drinking water of birds consuming such diet.

The results provided also indicate that the addition of sodium sulfate to drinking water containing a given amount of chlortetracycline will produce an increase in antibiotic blood levels of chicks drinking the treated water. Finally, the data clearly demonstrate that increased CTC blood levels are obtained from a given amount of CTC furnished in both the feed and drinking water when sodium sulfate is added to the drinking water.

EXAMPLE 3

The following tests were conducted to determine whether or not the addition of the described sulfate to a medicated poultry drinking water would increase consumption of treated water and thus increase consumption of medicament.

Chicks, 5-days old, of similar size and weight wre randomly selected for 36 test groups, 12 chicks per group. These groups were separately caged and starved overnight. The following morning a standard, commercial diet, comprising:

| Diet | % |
|---|---|
| Ground yellow corn | 40.7 |
| Soybean oil meal | 45.5 |
| Menhaden fish meal | 7.5 |
| $CaCO_3$ | 2.4 |
| Dicalcium phosphate | 2.0 |
| Brewers dried yeast | 1.25 |
| Iodized salt | 0.250 |
| Magnesium sulfate | 0.025 |
| Vitamin A (10,000 IU/gm.) | 0.110 |
| Vitamin D-3 (15,000 ICU/gm.) | 0.009 |
| Choline chloride - 25% supplement | 0.125 |
| Vitamin supplement 92 | 0.100 |
| Proferm - 20 (vitamin $B_{12}$ supplement) | 0.025 |
| Niacin | 0.0044 |
| D-alpha tocopherol acetate | 0.00055 |
| Parvo 3% (folic acid supplement) | 0.0030 | was provided for all groups of chicks. Water containing various medicaments and specified amounts of sodium sulfate was also provided. The groups of birds were weighed at the start of the test period and the average weights calculated and recorded. Weighed amounts of feed were also provided along with measured quantities of water. The chicks were permitted to feed and drink ad libitum for 3 hours. Then they were re-weighed and the amount of feed and drink consumed was determined. Every three hours thereafter for a 24 hour period the above procedure was repeated. At the end of the test period all results were tabulated and the findings appear in Table III below where it is clearly shown that the addition of sodium sulfate to a medicated drinking water produces a substantial increase in the consumption thereof.

TABLE III

Consumption of Medicated Drinking Water

| Time (Hours) | $H_2O$ | CTC.HCl 2 g/gal | CTC.HCl 2 g/gal +$Na_2SO_4$ 0.71% | 2-Amino-5-nitro-thiazole 2.36 g/gal | 2-Amino-5-nitro-thiazole 2.36 g/gal +$Na_2SO_4$ 0.71% | Tylosin Tartrate 2 g/gal | Tylosin 2 g/gal +$Na_2SO_4$ 0.71% | CTC.$SO_4$ 2 g/gal | CTC.$SO_4$ 2 g/gal +$Na_2SO_4$ 0.71% |
|---|---|---|---|---|---|---|---|---|---|
| | | | AVERAGE WATER CONSUMPTION MI/100 GRAMS CHICK | | | | | | |
| 3 | 7.17 | 5.84 | 7.24 | 5.95 | 7.88 | 6.46 | 9.64 | 4.04 | 3.72 |
| 6 | 12.08 | 11.14 | 14.71 | 11.82 | 14.13 | 12.07 | 19.09 | 9.02 | 8.65 |
| 9 | 16.92 | 15.88 | 21.76 | 16.82 | 19.34 | 17.11 | 27.37 | 13.70 | 14.10 |
| 12 | 21.99 | 21.25 | 29.31 | 21.70 | 24.97 | 22.35 | 35.78 | 18.47 | 21.03 |
| 15 | 26.67 | 26.21 | 35.33 | 26.70 | 29.42 | 26.88 | 44.52 | 22.76 | 27.13 |
| 18 | 31.92 | 31.64 | 42.12 | 31.94 | 35.16 | 31.73 | 53.02 | 27.93 | 34.17 |
| 21 | 36.68 | 37.13 | 49.03 | 36.37 | 40.12 | 36.93 | 62.51 | 33.61 | 40.95 |
| 24 | 41.78 | 42.41 | 55.90 | 41.49 | 46.36 | 42.69 | 70.61 | 38.16 | 48.15 |
| | | | AVERAGE FEED CONSUMPTION GMS/100 GRAMS CHICK | | | | | | |
| 3 | 8.29 | 6.92 | 8.12 | 7.13 | 7.19 | 7.50 | 7.28 | 7.33 | 7.43 |
| 6 | 11.03 | 10.09 | 10.78 | 10.00 | 9.65 | 10.86 | 9.87 | 9.81 | 9.97 |
| 9 | 14.12 | 13.30 | 13.87 | 13.10 | 12.38 | 13.83 | 12.67 | 13.03 | 12.51 |
| 12 | 17.48 | 16.54 | 16.93 | 16.69 | 14.92 | 16.98 | 15.97 | 16.23 | 15.80 |
| 15 | 20.96 | 19.24 | 19.96 | 19.50 | 17.66 | 19.77 | 18.93 | 18.90 | 18.33 |
| 18 | 24.51 | 22.36 | 22.96 | 22.98 | 20.17 | 22.83 | 21.63 | 21.75 | 21.20 |
| 21 | 27.75 | 25.40 | 25.48 | 25.48 | 22.59 | 26.07 | 24.49 | 24.87 | 23.97 |
| 24 | 30.79 | 28.30 | 28.44 | 28.30 | 25.32 | 28.97 | 27.39 | 27.40 | 26.71 |
| | | | AVERAGE WATER TO FEED RATIO | | | | | | |
| 3 | 0.81 | 0.85 | 0.90 | 0.84 | 1.08 | 0.86 | 1.35 | 0.54 | 0.50 |
| 6 | 1.10 | 1.11 | 1.39 | 1.20 | 1.46 | 1.11 | 1.94 | 0.91 | 0.86 |
| 9 | 1.21 | 1.20 | 1.59 | 1.30 | 1.56 | 1.24 | 2.17 | 1.06 | 1.13 |
| 12 | 1.26 | 1.28 | 1.76 | 1.31 | 1.67 | 1.32 | 2.24 | 1.14 | 1.34 |
| 15 | 1.27 | 1.36 | 1.80 | 1.39 | 1.67 | 1.36 | 2.36 | 1.21 | 1.48 |
| 18 | 1.30 | 1.41 | 1.86 | 1.40 | 1.75 | 1.39 | 2.47 | 1.29 | 1.62 |
| 21 | 1.33 | 1.46 | 1.94 | 1.44 | 1.78 | 1.42 | 2.57 | 1.36 | 1.71 |

TABLE III-continued

| | | | | | 2-Amino- | | | | |
| | | | CTC.HCl | 2-Amino- | 5-nitro- | | Tylosin | | CTC.SO₄ |
| | | | 2 g/gal | 5-nitro- | thiazole | Tylosin | 2 g/gal | | 2 g/gal |
| Time | | CTC.HCl | +Na₂SO₄ | thiazole | 2.36 g/gal | Tartrate | +Na₂SO₄ | CTC.SO₄ | +Na₂SO₄ |
| (Hours) | H₂O | 2 g/gal | 0.71% | 2.36 g/gal | +Na₂SO₄ 0.71% | 2 g/gal | 0.71% | 2 g/gal | 0.71% |
|---|---|---|---|---|---|---|---|---|---|
| 24 | 1.36 | 1.50 | 1.98 | 1.48 | 1.84 | 1.47 | 2.59 | 1.40 | 1.80 |

CTC.HCl = Chlortetracycline hydrochloride
CTC.SO₄ = Chlortetracycline bisulfate

EXAMPLE 4

Five day-old chicks of similar weight and size were randomly divided into 32 groups of 12 chicks each. These groups were weighed and the average weight of the chicks calculated and recorded. The groups were then placed in separate cages and starved overnight. The following morning weighed amounts of food and measured quantities of water were provided for each group. All groups received the same standard commercial diet set forth in Example 3 above. No medication or feed supplement was added to the diet. However, the drinking water supplied to quadruplicate groups of chicks contained various concentrations of sulfates, sweeteners or commercially available electrolytes.

Four control groups were run and they received the standard diet and untreated water. At 3, 6, 12, 21 and 24 hours after feeding was begun, all groups of chicks were weighed. The amounts of feed and water consumed were also determined by weighing and measuring and the average consumption of food and water calculated for each period. From Table IV below, it can here be readily seen that the addition of sodium and potassium sulfate to the drinking water noticeably increased the consumption of water without adversely affecting food consumption. Other additives tested produced little or no change in either water or feed composition.

At sodium sulfate levels of 1.42% in the drinking water, average water consumption increased measureably over that obtainable with 0.71%, but average feed consumption began to taper off. While high levels, i.e., above 1.0% sodium sulfate in the drinking water, are very effective, such levels should be used for short duration. Low levels, i.e., below 1.0% and preferably about between 0.3 and 0.7% are recommended for continuous use.

TABLE IV

Drinking Water Consumption

| Time (Hours) | H₂O | Na₂SO₄ 0.355% | Na₂SO₄ 0.71% | Sucrose 0.71% | Cerelose 0.71% | K₂SO₄ 0.71% | Electrolyte 0.312% KCl 0.042% Ca(OH)₂ 0.01% MgSO₄ |
|---|---|---|---|---|---|---|---|
| | | AVERAGE WATER CONSUMPTION — Ml/100 GM CHICK | | | | | |
| 3 | 8.67 | 10.91 | 11.97 | 8.70 | 9.23 | 8.72 | 8.65 |
| 6 | 14.43 | 18.67 | 20.75 | 15.08 | 15.00 | 16.04 | 14.21 |
| 12 | 27.14 | 33.33 | 39.28 | 26.69 | 26.87 | 31.02 | 25.96 |
| 21 | 43.39 | 53.72 | 64.62 | 43.40 | 43.95 | 51.26 | 43.53 |
| 24 | 49.88 | 60.79 | 71.96 | 49.20 | 50.33 | 58.65 | 50.18 |
| | | AVERAGE FEED CONSUMPTION — GMS/100 GM CHICK | | | | | |
| 3 | 6.70 | 6.45 | 7.43 | 6.31 | 6.67 | 4.95 | 7.23 |
| 6 | 10.52 | 10.37 | 10.88 | 10.03 | 10.53 | 9.24 | 10.60 |
| 12 | 17.78 | 17.09 | 17.83 | 17.13 | 17.53 | 15.99 | 18.55 |
| 21 | 27.01 | 26.34 | 27.73 | 26.07 | 26.02 | 24.46 | 27.81 |
| 24 | 30.78 | 29.69 | 31.24 | 29.27 | 29.84 | 28.00 | 31.50 |
| | | AVERAGE WATER TO FEED RATIO | | | | | |
| 3 | 1.32 | 1.70 | 1.61 | 1.38 | 1.44 | 1.76 | 1.20 |
| 6 | 1.39 | 1.80 | 1.94 | 1.50 | 1.46 | 1.74 | 1.37 |
| 12 | 1.53 | 1.95 | 2.23 | 1.56 | 1.56 | 1.95 | 1.41 |
| 21 | 1.61 | 2.04 | 2.34 | 1.67 | 1.71 | 2.10 | 1.57 |
| 24 | 1.62 | 2.05 | 2.31 | 1.69 | 1.71 | 2.10 | 1.59 |

EXAMPLE 5

Potentiation of chlortetracycline blood levels in chicks fed a corn diet containing 200 ppm of CTC.HCl and 0.8% calcium ion from calcium carbonate is achieved with the addition of sulfuric acid and ammonium sulfate. Groups of chicks were starved overnight then permitted to feed and drink ad libitum for 3 hours. At the end of the 3 hour period, the chicks were bled by cardiac puncture and the CTC blood levels assayed microbiologically. Chicks receiving the control diet containing 200 ppm of CTC, but no added sulfate ion, were found to have 0.11 γ/ml. of CTC in the blood. Those receiving 1.03% dietary sulfate ion furnished from sulfuric acid had CTC blood levels of 0.26 γ/ml. Those receiving the same level of sulfate ion from ammonium sulfate had CTC blood levels of 0.21 γ/ml.

I claim:

1. A medicated poultry drinking water composition comprising water and a medicament selected from the group consisting of tylosin, 2-amino-5-nitrothiazole and 2-acetylamino-5-nitrothiazole and a sulfate of a cation carrying a single positive charge selected from the group consisting of sodium sulfate, sodium bisulfate, potassium sulfate, potassium bisulfate, ammonium sulfate, ammonium acid sulfate and sulfuric acid in an amount sufficient to provide from about 0.1 to about 1.0 percent by weight of sulfate ion in the water.

2. A method for controlling infectious diseases in poultry which comprises feeding poultry a medicated drinking water composition to increase the ingestion thereof by the poultry, which composition comprises water and a medicament selected from the group consisting of tylosin, 2-amino-5-nitrothiazole and 2-acetylamino-5-nitrothiazole, and a sulfate of a cation carrying a single positive charge selected from the group consisting of sodium sulfate, sodium bisulfate, potassium sulfate, potassium bisulfate, ammonium sulfate, ammonium acid sulfate and sulfuric acid in an amount sufficient to provide from about 0.1 to about 1.0 percent by weight of sulfate ion in the water.

* * * * *